United States Patent [19]

Ohshima et al.

[11] Patent Number: 5,634,136
[45] Date of Patent: May 27, 1997

[54] DATA PROCESSOR AND METHOD OF CONTROLLING THE SAME

[75] Inventors: Toshiharu Ohshima; Tatsumi Nakada, both of Kawasaki, Japan

[73] Assignee: Fujitsu Limited, Kawasaki, Japan

[21] Appl. No.: 569,866

[22] Filed: Dec. 8, 1995

Related U.S. Application Data

[63] Continuation of Ser. No. 186,648, Jan. 26, 1994, abandoned.

[30] Foreign Application Priority Data

Mar. 15, 1993 [JP] Japan ..................................... 5-054342

[51] Int. Cl.$^6$ ....................................................... G06F 9/40
[52] U.S. Cl. ...................... 395/800; 395/393; 364/232.8; 364/261.3; 364/263.1; 364/DIG. 1
[58] Field of Search ..................................... 395/800, 375, 395/250, 427, 775; 364/131–134

[56] References Cited

U.S. PATENT DOCUMENTS

| | | | |
|---|---|---|---|
| 4,392,200 | 7/1983 | Arulpragasam et al. | 364/200 |
| 4,926,323 | 5/1990 | Baror et al. | 364/200 |
| 5,136,696 | 8/1992 | Beckwith et al. | 395/375 |
| 5,193,157 | 3/1993 | Barbour et al. | 395/375 |
| 5,349,671 | 9/1994 | Maeda et al. | 395/800 |
| 5,461,722 | 10/1995 | Goto | 395/800 |
| 5,507,028 | 4/1996 | Liu | 395/375 |
| 5,513,330 | 4/1996 | Stiles | 395/375 |

*Primary Examiner*—Alpesh M. Shah
*Attorney, Agent, or Firm*—Staas & Halsey

[57] ABSTRACT

There are provided a means for storing an instruction, a first control means for decoding and executing the instruction of said means for storing during a timing period which is used in said instruction, a means for computing an address data required for execution of said instruction, a first storage means having a plurality of registers for storing said computed address data, a means for selecting specific number resister in the first storage means, by controlling of the first control means during a timing period which is not used in said instruction, a second storage means for storing temporarily said address data in the specific number register selected by said means for selecting, a second control means for decoding the instruction before the first control means decoding and finding out the instruction to be branch instruction, and a means for outputting the address data from the second storage means as a target address data, when the register of the first storage means designated by said branch instruction coincides with the specific number register selected by the means for selecting.

10 Claims, 8 Drawing Sheets

FIG.1

*PRIOR ART*

DATA PROCESSOR AND METHOD OF CONTROLLING THE SAME

This application is a continuation of application Ser. No. 08/186,648, filed Jan. 26, 1994, now abandoned.

BACKGROUND OF THE INVENTION

1. Field of the Invention

The present invention relates to a data processor for applying pipe-line processing to various data and a method of controlling the same, and more specifically to improvement of a processor provided with a copy function for making a data processing speed high at a time of a branch instruction.

2. Description of the Related Art

Techniques such as a pipe-line processing system and parallel execution of a plurality of instructions have been used frequently in recent years in a data processor such as a microprocessor in order to improve the performance.

According to these techniques, if there is a gap between a present instruction and a next instruction when an instruction is executed by pipe-line processing, data processing performance is lowered. Therefore, consideration is given so that an instruction supply through a pipe-line is not stopped by providing an instruction prefetch buffer with the processor concerned.

Figure 1:
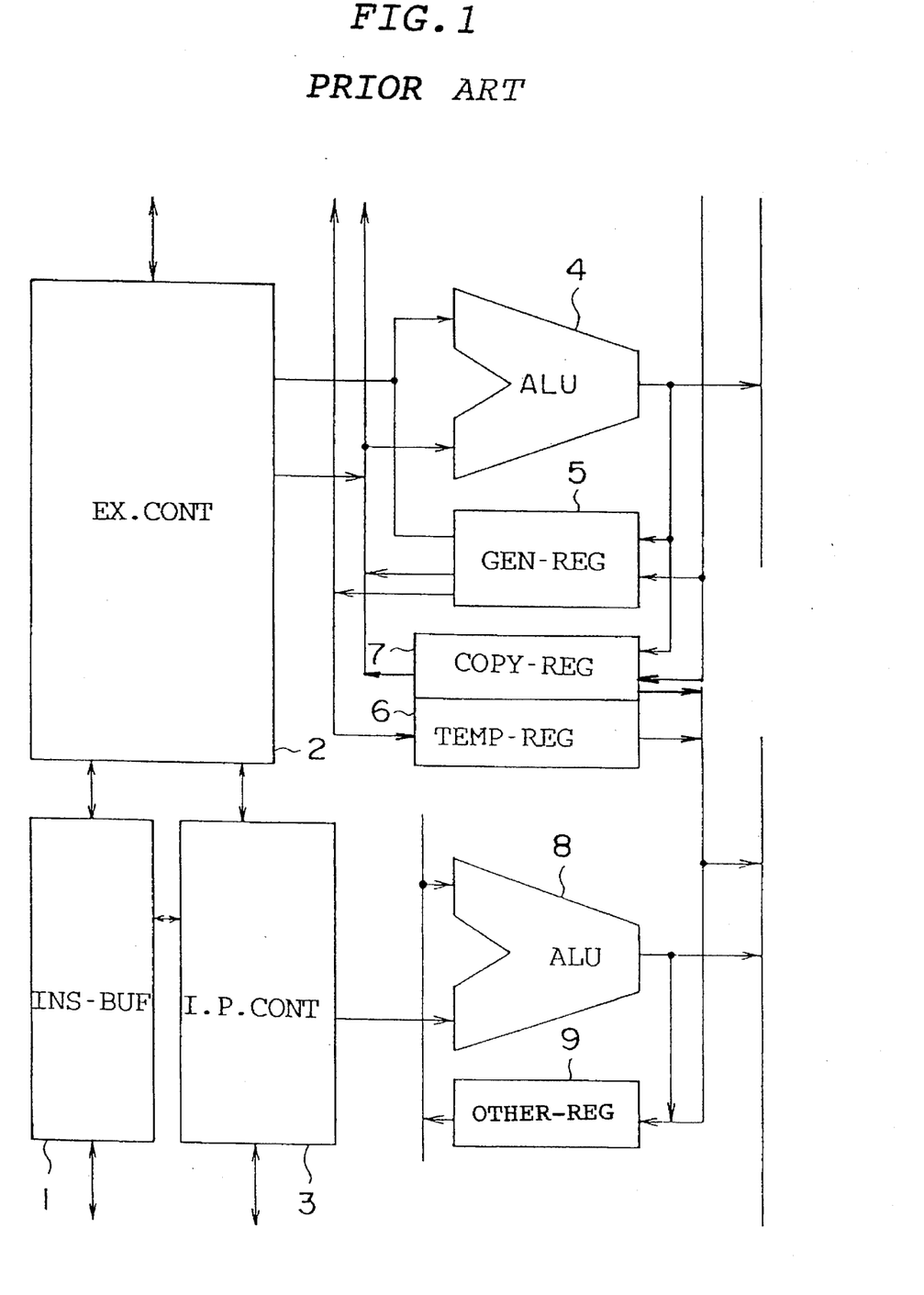
FIG. 1 is a block diagram of a data processor according to the related art of the present invention.

Here, the related art of the present invention will be described. For example, a data processor provided with a copy register for making the data processing speed at time of branch instruction high is composed of an instruction buffer 1, an execution controller 2, an instruction prefetch controller 3, an arithmetic and logical unit (hereinafter referred to as an ALU) 4, a general register 5, a temporary register 6, a copy register 7, another arithmetic and logical unit (hereinafter referred to as an ALU) 8 and another register 9, as shown in FIG. 1.

The copy register 7 always copies the address data 40 be the same as the address data of a register having a specific number in the general register 5 and holds them. Here, it is assumed that the specific number is GR3. The temporary register 6 holds data outputted to a read port of the general register 5 temporarily.

The function of the data processor concerned is such that, when the instruction stored in the instruction buffer 1 is fetched to the execution controller 2, the instruction code thereof is decoded by the execution controller 2, and the outputs of the ALU 4, the general register 5, the temporary register 6 and the GR3 copy register 7 are controlled based on the result of decoding of the instruction code. For example, when the branch instruction (hereinafter referred to also as a jump instruction) is executed, the data fetched from the general register 5 are outputted to an instruction address bus through the temporary register 6 so as to fetch the branch instruction when a branch address is designated in the general register 5 having a specific number, However, the branch address is read out of the copy register 7 and the jump instruction is executed based on the data.

Further, a branch address corresponding to a program counter is computed in the ALU 8, and the result is held in another register 9.

This is aimed at not stopping the instruction supply through the pipe-line of the processor concerned so as to achieve a high data processing speed at time of branch instruction.

SUMMARY OF THE INVENTION

It is an object of the present invention to achieve at a high speed of jump operation by making a general register serve double purpose without providing an exclusive copy register. In other words, the object is to receive designation of a branch address by a general register having a specific number, to validate the branch address corresponding to detection of the branch instruction, and to achieve improvement of performance of a data processor while restraining the size of hardware.

It is another object of the present invention to shorten an execution cycle of branch operation and to check indication of instruction prefetch in the case of normal operation.

Figure 3:
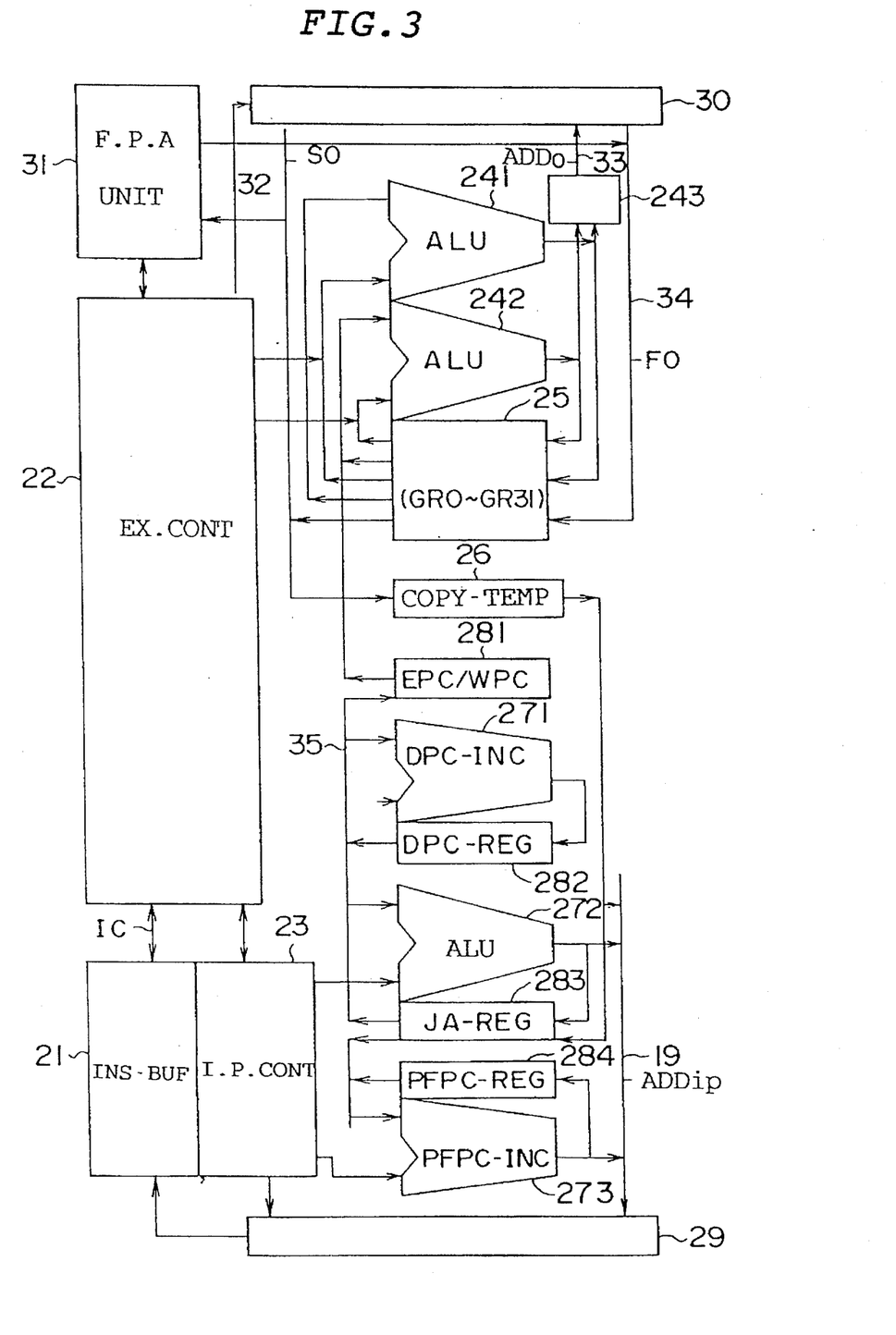
FIG. 3 is a block diagram of a data processor according to a preferred embodiment of the present invention.

Namely, a data processor according to the present invention is provided with, as shown with a preferred embodiment in FIG. 3, a means for storing an instruction, a first control means for decoding and executing the instruction of the means for storing during a timing period which is used in execution; a means for computing an address data required for execution of the instruction; a first storage means having a plurality of registers for storing the computed address data; a means for selecting a specific number resister in the first storage means in accordance with the instruction of the first control means during a timing period which is not used in execution; a second storage means for storing temporarily the address data in the specific number register of the first storage means selected by the means for selecting; a second control means for acquiring the instruction from the storage means before the first control means, decoding the instruction and detecting that the instruction is a branch instruction; and a means for outputting the address data from the second storage means as branch address data when the register of the first storage means designated by the branch instruction selected by the second control means coincides with the specific number register of the first storage means selected by the means for selecting.

Further, the second control means has a flag register for detecting whether the register of the first storage means designed by the branch instruction coincides with the specific number register of the first storage means or not.

Furthermore, the second control means comprises a pre-decode controller for starting instruction fetch with the address data held by the second storage means as branch address data; and a lump controller for canceling the instruction fetch when the instruction fetch is determined to be an error.

By adopting such a structure, a register for fetching an address read out of the first storage means by means of the branch instruction by designation of a register other than a specific number register is made to also serve as the second storage means (the temporary register) for temporarily storing the address data of the specific number register of the first storage means, thus making it possible to utilize the second storage means for storing the address data for branch operation effectively and to check enlargement of hardware to the utmost.

DESCRIPTION OF THE PREFERRED EMBODIMENTS

Now, according to the related art of the present invention, if there is a gap between an instruction and a next instruction when the instruction concerned is pipe-line processed, the data processing performance is lowered. Therefore, consideration is given so that an instruction supply through a pipe-line is not stopped by providing the processor concerned with an instruction (prefetch) buffer 1 such as shown in FIG. 1.

When a jump instruction appears, however, it is required to compute a branch address thereof and try an instruction fetch from a new address again. Thus, a gap is generated in instruction supply. There are two methods of computing a branch address of a jump instruction.

In a first method, a branch address is designated relatively to an instruction address of a jump instruction itself, i.e., an address shown by a program counter owned by the processor concerned. In a second method, a branch address is designated in accordance with the address data of a general register 5 such as shown in FIG. 1. Either one of these two methods is adopted. In the former case, a register which becomes a base is specified by a program counter, and the branch address is fixed. Hence, data processing is easily made high in speed.

As against the above, in the latter case, i.e., in the case of a jump instruction designating a branch address in accordance with the address data of the general register 5, it is required to select and read data out of a plurality of registers and to transfer the data to another register. The number of general registers 5 is defined by the system. Moreover, since the branch address is varied by rewriting the address data of the register, it becomes more difficult to achieve a high speed.

In a technique for making the jump instruction high in speed using such a general register 5, a specific general register 5 is allocated preferentially for the jump instruction, and the address data of this register are transferred exclusively to a copy register 7.

As a result, it is required to prepare the copy register 7 in addition to a register file of the general register 5. However, elimination of problems such as read time, transfer time, read delay time of the general register 5 is made. Here, the read time means time required to fetch data from a designated register to a read port. The transfer time means time required for transferring data from the read port to another register. The read delay time means time required for waiting until the read port of the register file becomes usable.

Besides, in a compiler, when a general register 5, having a specific number (GR3) is allocated preferentially for a jump instruction, it becomes possible to achieve a high speed of the processor concerned in a case when the general register 5 having the specific number is used.

In the case of a data processing system including such a copy register 7, however, a hardware quantity is increased, and the address data of the copy register 7 have to be made to always coincide with the address data of the register file.

In particular, when the number of the ALU 4 is increased so as to increase the degree of parallism of data processing, the write frequency in the register file is also increased. As a result, there is such a problem that the hardware cost required for having the address data of the register file and the address data of the copy register 7 coincide with each other is increased against fetching from any port.

Figure 2:
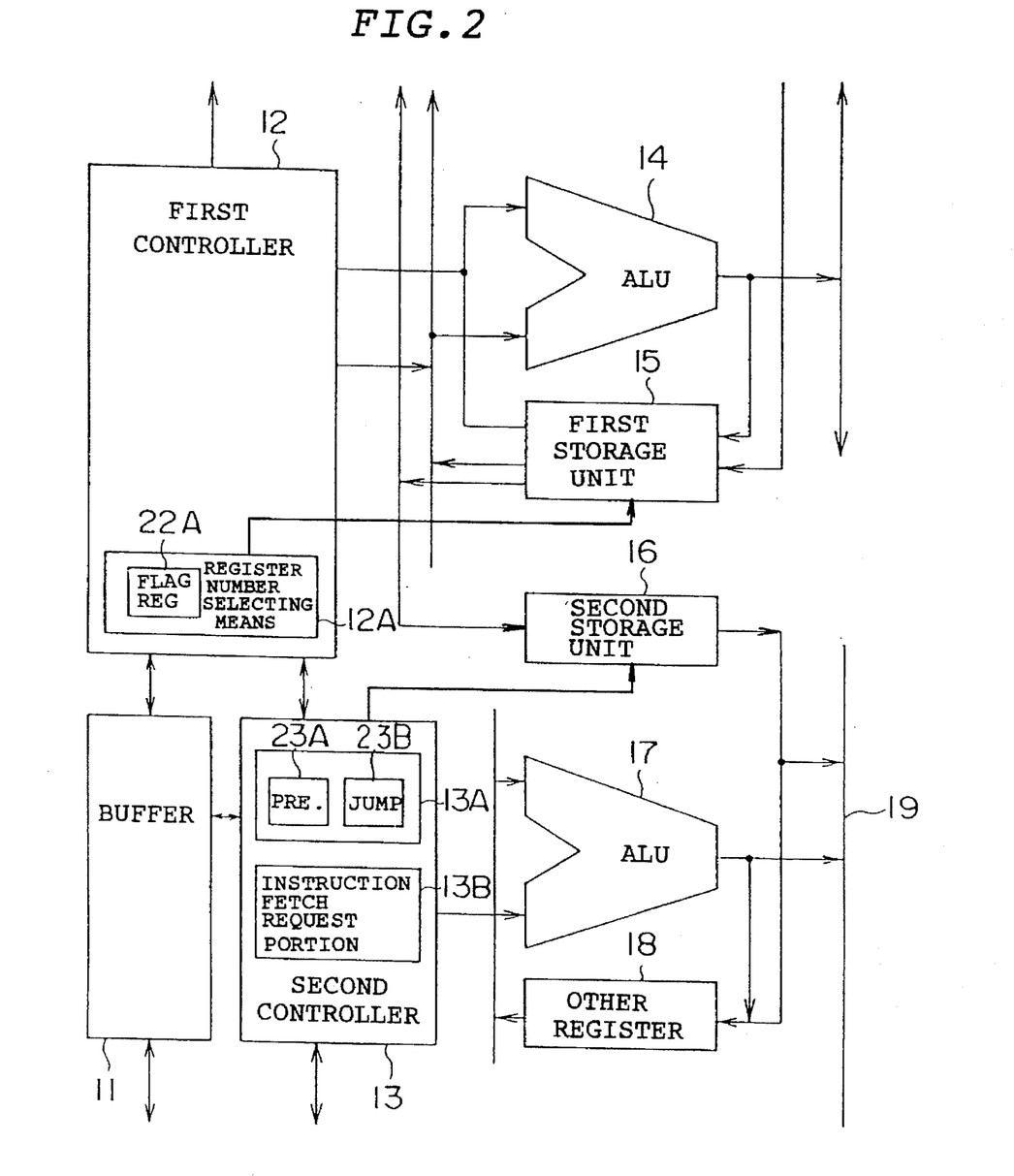
FIG. 2 is a block diagram in principle of a data processor according to the present invention.

In contrast to the above, a data processor in principle according to the present invention is provided with an instruction buffer means 11 for storing instructions. An execution control means 12 is provided for decoding an instruction code fetched from the instruction buffer means 11 and controlling execution of the instruction based on the result of decoding. The execution control means 12 controls an arithmetic and logical means 14 and a general storage means 15. A temporary storage means 16 receives and holds data transmitted to one read port of the general storage means 15. Branch instruction operating means 13 designates a branch address in response to the general storage means 15 as shown in FIG. 2.

Further, a register selector 12A is provided in the execution control means 12. The register selector 12A fetches the address data, of the register having a predetermined specific number of the general storage means 15, selectively to one of the read ports and holds the address data in the temporary storage means 16 during a non-execution time, i.e., time which is not used in executing the instruction.

Furthermore, a branch instruction detector 13A and an instruction fetch requirement portion 13B are provided in the branch instruction operating means 13. The branch instruction detector 13A decodes an instruction code fetched from the instruction buffer means 11 and detects a branch instruction branched to an address designated by the general storage means 15. The instruction fetch requirement portion 13B outputs the address data held by the temporary storage means 16 to an instruction fetch address bus 19 in response to detection of a branch instruction, and makes the address data held by the temporary storage means 16 effective when the general storage means 15 designated by the branch instruction coincides with the general storage means 15 having a specific number.

A flag register 22A is provided in the register selector 12A of the data processor of the present invention. The flag register 22A identifies whether the temporary storage means 16 holds the same address data as those of the general storage means 15 having a specific number or not.

A first control method in principle of a data processor of the present invention is first directed to fetch the general storage means 15 having a specific number selectively to the read port when a specific one of the read ports of the general storage means 15 is not used by the instruction during execution. Next, the branch instruction operating means 13 is directed to fetch the data read out selectively to the temporary storage means 16, and sets the flag register 22A at the same time. Furthermore, the branch instruction operating means 13 controls a selection of any one of the registers of the general storage means 15; controls a transmission of the address data to one of the read ports of the general storage means; and control transmission of the address data from the read port of the general storage means to the temporary storage means 16 in accordance with execution of several instructions, and resets the flag register 22A at the same time.

Further, the branch instruction operating means 13 reserves a write of a branch address at a specific number of the general storage means 15 designated by an instruction in accordance with execution of the instruction. The reservation of the branch address is made synchronously or asynchronously with the general storage means 15. As a result, the reserved state of the write of the branch address is held until the write of the branch address is executed in the reserved general storage means 15.

With this, when an instruction code fetched from the instruction buffer means 11 is decoded and a branch instruction designating a branch address is detected in the general storage means 15 having a specific number, and if the flag register 22A is in a set state and the write into the general storage means 15, having the specific number, is not prearranged by an instruction before the branch instruction, the instruction fetch address is switched so as to perform instruction fetch with the address data held in the temporary storage means 16 as the address.

Further, in a data processor in principle of the present invention, a predecode controller 23A and a jump controller 23B are provided in the branch instruction detector 13A. The predecode controller 23A starts an instruction fetch with the address data held by the temporary storage means 16 as the address, by detecting a specific branch instruction. The jump controller 23B cancels instruction fetch when the instruction fetch from the address data of the temporary storage means 16 by the decoding result of the execution controller 12 is decided to be an error.

Further, according to a second control method in principle of the present invention, an instruction code fetched from the instruction buffer means 11 is decoded, and an instruction fetch is started with the address data held in the temporary storage means 16 as the address when a branch instruction in which the branch address is designated by the general storage means 15 is detected. Further, when the instruction designates other than the general storage means 15 having a specific number, instruction fetch is canceled by one or more primary factors of either a case when the flag register 22A is reset or a case when write into the general storage means 15 is prearranged by the operation of an instruction before the branch instruction.

Next, the operation of a data processor in principle of the present invention will be described. For example, when an instruction code fetched from the buffer means 11 is decoded by the execution control means 12, execution of the instruction is controlled by the execution control means 12 based on the result of decoding, computation designated by the instruction is performed by the arithmetic and logical means 14, and data are held by the general storage means 15 as the result thereof. Further, the data fetched to one read port of the general storage means 15 are received and held by the temporary storage means 16, and the branch instruction operation to the branch address is controlled by the branch instruction operating means 13.

At this time, the general storage means 15 having a predetermined specific number is selected at one read port by the register selector 12A provided in the execution control means 12 in a timing which is not used by the instruction, the address data thereof are read, and the address designated by the general storage means 15 is detected by the branch instruction detector 13A provided in the branch instruction operating means 13 in accordance with the result of decoding the instruction code fetched from the instruction buffer means 11, and the branch operation thereof is executed.

Further, in the instruction fetch requirement portion 13B, the address data held in the temporary storage means 16 are outputted to the instruction fetch address bus 19 by detection of the branch instruction. Here, when the number of the general storage means 15 designated by the branch instruction coincides with the predetermined specific number, the address data are transferred to the temporary storage means 16 in advance, and the address data held therein are made effective.

Thus, by arranging to read the general storage means 15 having a specific number when one read port of the general storage means 15 is not used explicitly by the instruction, the read address data are held by the temporary storage means 16, and, when a lump instruction is detected and the branch address is by an instruction designated by the general storage means 15 having a specific number, jump operation is performed using the address data of the temporary storage means 16, thus making it possible to process the jump instruction at a high speed without having an exclusive copy register.

In particular, although a hit probability is lowered, it is possible to utilize the register for storing the address for branch operation temporarily and to control the increase of hardware to the utmost by using a register for fetching data read out of the general storage means 15 by a jump instruction designated by the general storage means 15 having a number other than the specific number also as a temporary storage means 16 (a temporary register) for storing the address data of data having the specific number temporarily.

Besides, when branch prefetch by the temporary storage means 16 is correct, it is possible to shorten the execution cycle of the branch operation and to deter designation of instruction prefetch in the case of normal operation.

With this, it becomes possible to aim at improvement of processing performance of a data processor while looking to reduction of the hardware.

Next, a preferred embodiment of the present invention will be described with reference to the drawings. For example, a data processor having two sets of arithmetic and logical units ALUs 241 and 242 and capable of executing two arithmetic operations in parallel at the same time in which a temporary register 26 also has a copy function and execution is performed at a high processing speed at time of branch instruction is composed of, as shown in FIG. 3, an instruction prefetch buffer 21, an execution controller 22, an instruction prefetch control circuit 23, arithmetic and logical units (hereinafter referred to as ALUs) 241 and 242, a general register 25, a temporary register with copy function (hereinafter referred to as COPY-TEMP-REG) 26, other arithmetic and logical units (DPC-INC, ALU, PFPC-INC) 271, 272 and 273, other registers (EPC & WPC, DPC-REG, JA-REG, PFPC-REG) 281 to 284, an instruction side memory management unit (hereinafter referred to simply as I.M.U/cache) 29, an operand side memory management unit (hereinafter referred to simply as an O.M.U/cache) 30, a floating point arithmetic unit 31 or the like.

Besides, there are a super scalar system and a Very Long Instruction Word (VLIW) system in the parallel execution system of a plurality of instructions, but either system may be adopted in the present invention. Here, description will be made on the case of the VLIW system.

Namely, the instruction prefetch buffer 21 is an embodiment of the instruction buffer means 11, and prefetches an instruction and stores it. For example, the instruction prefetch buffer 21 supplies an instruction code IC to an instruction decoder of the execution controller 22. Besides, the instruction prefetch buffer 21 will be described in detail with reference to FIG. 4.

Figure 6:
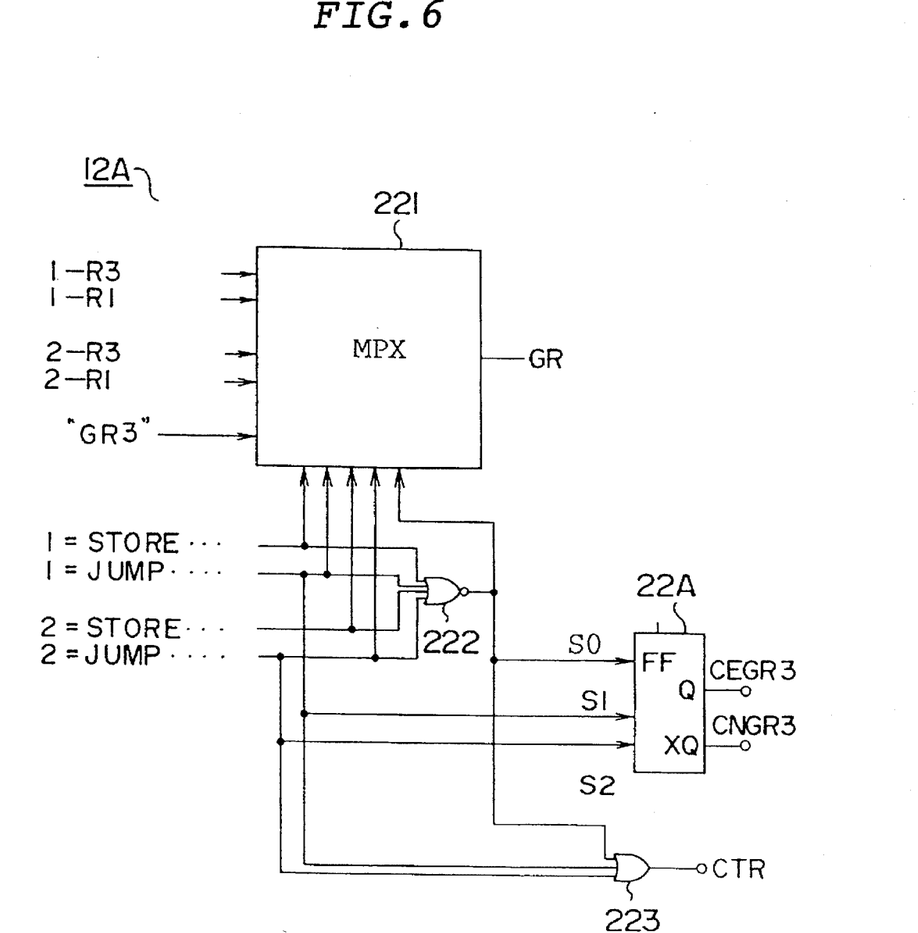
FIG. 6 is a block diagram of a GR fetch selector according to an embodiment of the present invention.

The execution controller 22 is an embodiment of the execution control means 12. It decodes the instruction code IC fetched from the instruction prefetch buffer 21, and controls execution of the instruction based on the result of decoding. For example, a GR fetch selector which is an example of the register selector 12A such as shown in FIG. 6 is provided in the execution controller 22. Besides, the GR fetch selector 12A will be described in detail with reference to FIG. 6.

The instruction prefetch control circuit 23 is an embodiment of the branch instruction operating means 13. It controls execution of branch operation or the like in which a branch address is designated by a general register 25. Besides, the instruction prefetch control circuit 23 will be described in detail along with the instruction prefetch buffer 21 with reference to FIG. 4.

Further, the ALUs 241 and 242 show an embodiment of the arithmetic means 14, which is controlled by the execution controller 22. For example, the ALU 241 and the ALU 242 are connected to an operand address bus 33 and the execution controller 22. An operand address $ADD_o$ is transferred to the O.M.U/cache 30 through the operand address bus 33.

The general register 25 is an embodiment of the general storage means 15, and is connected to a store operand bus 32 and a fetch operand bus 34. Besides, a store operand SO is transferred to the O.M.U/cache 30 through the store operand bus 32. A fetch operand FO is received from the O.M.U/cache 30 through the fetch operand bus 34.

There are provided five read ports and three write ports in the general register 25. In general, two source operands are read and the result of computation is written in one integer arithmetic operation, and two read ports and one write port are allocated for respective arithmetic operations. The remaining one port for read or write is used when data are transmitted to the floating point arithmetic unit 31 and the data are received in the case of loading or storing operation. This final read port is also utilized for reading out of the general register 25 indicating a branch address of a jump instruction.

The COPY-TEMP-REG 26 is an embodiment of the temporary storage means 16, and receives and holds data fetched to a read port having a specific number of the general register 25. Namely, what differs from the related art of the present invention is the fact that GR3 COPY-REG 7 shown in FIG. 1 is omitted, and TEMP-REG is replaced with the COPY-TEMP-REG 26.

For example, the COPY-TEMP-REG 26 holds the address data read for the jump instruction designated by the general register 25, and outputs an address to the prefetch address bus 19 in which the jump instruction is designated. Besides, there is no difference in a circuit configuration between the temporary register 6 according to the related art of the present invention and the COPY-TEMP-REG 26, but such data control that the address data of the general register 25 having a specific number are copied as much as possible in the COPY-TEMP-REG 26 is performed in the embodiment of the present invention. Thus, it is devised so as to perform operation similar to the function of COPY-REG according to the related art of the present invention.

Further, in a data processor according to an embodiment of the present invention, there are three pipe-line stages D, E and W for execution, and instruction decodes, arithmetic data, result data and so on are written at respective stages. Prefetch of instructions, loading of operands or storing operation are performed independently of these pipe-line processings asynchronously.

Thus, a data processor of the present embodiment is provided with a program counter (EPC & WPC) 281 corresponding to the stage E and the stage W, a program counter (DPC-REG) 282 corresponding to the stage D, a register (JA-REG) 283 corresponding to the jump address and a program counter (PFPC-REG) 284 corresponding to instruction prefetch, an incrementer corresponding to DPC-REG 282 (hereinafter referred to as DPC-INC) 271, other arithmetic and logical unit (hereinafter referred to as an ALU 272) and an incrementer corresponding to PFPC.-REG 284 (hereinafter referred to as PFPC-INC) 273.

Besides, as to the program counter corresponding to the stage D, the data of a PC bus 35 which are the data address data in the DPC-REG 282 or the data address data on the program counter bus (hereinafter referred to as a PC bus) 35 are outputted selectively from JA-REG 283. For example, the branch address transferred from JA-REG 283 in place of DPC-REG 282 is sent out onto the PC bus 35 immediately after branch operation.

Further, JA-REG 283 is a register for holding a branch address (hereinafter referred to as a jump address) $ADD_j$, and holds the jump address $ADD_j$ selected from the ALU 272 or COPY-TEMP-REG 26. PFPC-REG 284 is a circuit for holding an instruction prefetch address $ADD_{ip}$ in case of no branch operation. DPC-INC 271 adds an instruction length to a value on the PC bus 35 and calculates the address of a next instruction in case of no branch operation. In the embodiment of the present invention, a constant is added since an instruction format is an instruction of a fixed length.

The ALU 272 is an arithmetic and logical unit for calculating the branch address $ADD_j$ of the branch instruction corresponding to the program counter. PFPC-INC 273 is a circuit for renewing the instruction prefetch address $ADD_{ip}$ in case of no branch operation.

Besides, the I.M.U/cache 29 supplies an instruction to the instruction prefetch buffer 21. The O.M.U/cache 30 executes loading or storing operation of the operand, and supplies the fetch operand FO to the general register 25. The floating point arithmetic unit 31 performs floating point computation based on the result of instruction decoding.

Figure 4:
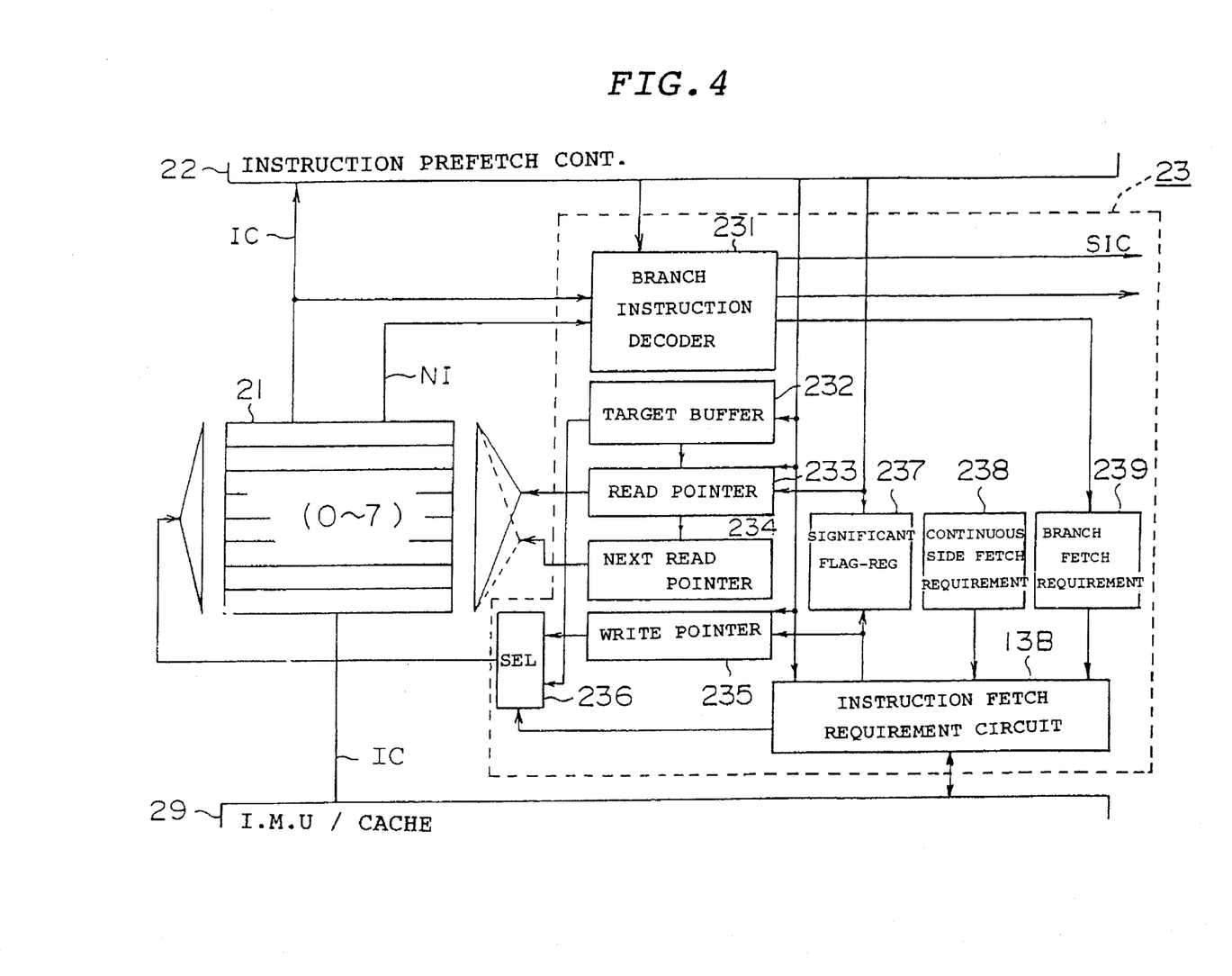
FIG. 4 is a control diagram of an instruction buffer and an instruction prefetch control circuit according to a preferred embodiment of the present invention.

Here, the instruction prefetch control circuit of a data processor according to an embodiment of the present invention will be described. For example, the instruction prefetch buffer 21 has a register with eight entries (0 to 7) equal to the bit portion of the length of the instruction such as shown in FIG. 4. Two entries are allocated for prefetching the branch target instruction. In the present embodiment, entry numbers 0 and 1 or entry numbers 6 and 7 are used by switching as the branch entry. Further, selection of the branch entry is changed over for every branch operation. Entry numbers 2 to 5 are used for instruction fetch. The instruction fetch at this time is always continuous.

Further, the instruction prefetch control circuit 23 is composed of a branch instruction decoder & instruction fetch address calculate/selection controller 231, a target buffer flag 232, a read pointer 233, a next read pointer 234, a write pointer 235, a selector 236, a significant flag register (0 to 7) 237, a continuous side fetch requirement portion 238, a branch fetch requirement portion 239 and an instruction fetch requirement circuit 13B.

The branch instruction decoder & instruction fetch address calculate/selection controller 231 is an embodiment of the branch instruction detector 13A. The branch instruction decoder is an example of the predecode controller 23A. The branch instruction decoder starts instruction fetch with the held address data of COPY-TEMP-REG 26 as the address or detects a branch instruction and generates branch fetch requirement by detecting a specific branch instruction. Further, the instruction fetch address calculate/selection controller is an embodiment of the jump controller 23B and performs such control as to calculate the address corresponding to the branch instruction or select a sending origin of the address.

For example, the instruction fetch address calculate/selection controller gives priority to a present instruction with respect to the present instruction (an instruction code corresponding to the stage D) and a next instruction code NI in the case of the instruction including branch operation. When only the instruction code NI is by branch operation, the branch operation of the next instruction is performed ahead.. In the case of a branch address corresponding to the program counter, however, a correcting calculation portion of the ALU 272 is structured of a three-input adder since it becomes necessary to correct the address data of the PC bus 35.

Besides, the branch instruction decoder receives a control signal outputted from the execution controller 22 and calculates the address, and performs control of selecting the instruction fetch address sending circuit as to branch operation which cannot be detected by the decoder. Here, branch operation which cannot be detected by the decoder means jump operation, interrupt operation or the like by designation by the general register 25 having a number other than the specific number.

Furthermore, since the instruction address is varied in the jump instruction even in the case of the general register 25 having a number other than the specific number, the branch instruction decoder detects only the jump instruction at the minimum. Then, a branch sequence is started, and control may be performed so as to determine whether the branch sequence is ratified based on the result of formal decoding with the instruction decoder of the execution controller 22 or the branch sequence is canceled and correct fetch is done over again.

Further, the target buffer flag 232 is a flag register for selecting a branch entry. The read pointer 233 indicates to fetch an instruction from the instruction prefetch buffer 21. The write pointer 235 selects an entry for writing an instruction in the instruction prefetch buffer 21. The read pointer 233 is renewed and permitted to be read when the last stage E, of one instruction comes to an end. With this, a new instruction is selected to be fetched. Further, in the present embodiment, the read pointer 233 and the next read pointer 234 show a next position so as to read the next instruction code NI in order to expedite detection of the branch instruction thereby to aim at a high speed of branch operation.

The continuous side fetch requirement portion 238 requires instruction fetch continuously then the instruction prefetch buffer 21 includes a vacant entry. The branch fetch requirement portion 239 requires branch fetch. The instruction fetch requirement circuit 13B requires instruction fetch. With this, it is possible to aim at a high speed by prefetching an instruction in the unit of two instructions (two entry portion). Namely, the write pointer 235 always indicates even-numbered entries to the buffer 21. With this, the entry designated by the write pointer 235 and an entry pair designated by the entry number plus one are written in the buffer 21 at the same time. Further, effective flags of respective entries are controlled by effective flag register (0 to 7) 237 adapting to read of the instruction from the instruction prefetch buffer 21 and write of the instruction thereto, and it is determined whether effectiveness of the read instruction and the next instruction is designated or not and the instruction prefetch buffer 21 includes a vacant entry pair or not.

Figure 5:
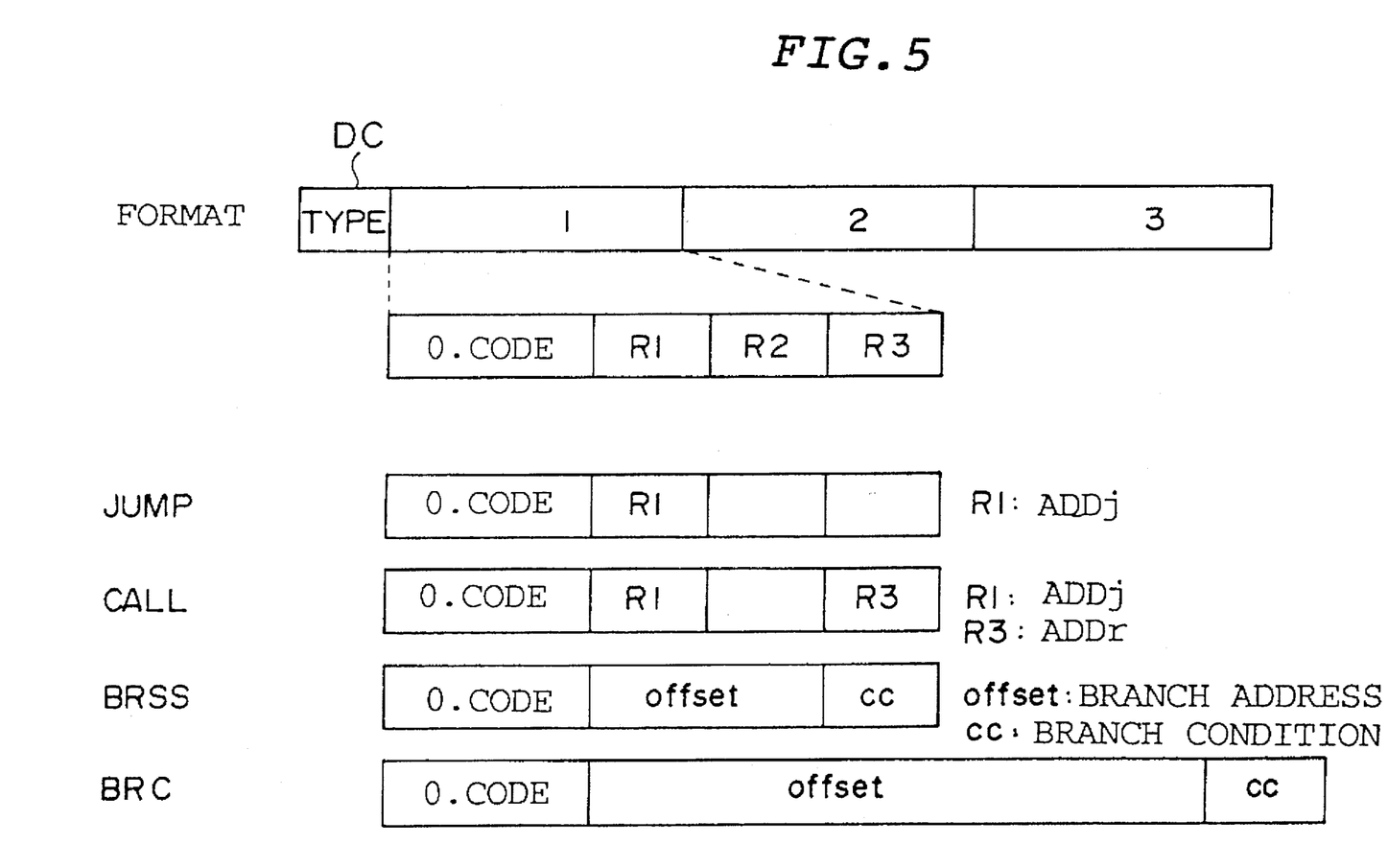
FIG. 5 is an explanatory diagram of instruction formats of a data processor according to an embodiment of the present invention.

Next, an instruction format of a data processor (of a VLIW system) according to an embodiment of the present invention will be described. When an instruction applied to the data processor concerned includes, for example, three operation fields 1 to 3, and operation codes capable of parallel operation are stuffed in respective fields as shown in FIG. 5. With this, the instruction forms one long instruction word. For example, when a long immediate value is contained in an operation code in the operation of a basic form of instruction, two or more operation fields are used by concatenating them to each other. Further, an R1 field is included following to the operation code in a JUMP instruction. The R1 field is a field for designating a jump address $ADD_j$. An R1 field and an R3 field are contained following to the operation code in a CALL instruction. The R1 field is a field for designating the jump address $ADD_j$. The R3 field is a field for designating a register for storing a return address $ADD_r$.

Furthermore, a short branch (BRCS) instruction includes branch address offset and branch condition CC following to the operation code. Branch address offset which is longer than that in the BRCS instruction and branch condition CC are included following to the operation code in a long branch (BRC) instruction. With this, it becomes possible to perform computation of two integers at the maximum, branch operation, floating point operation, and parallel operation such as loading or storing operation from a memory.

Next, a GR fetch selector of a data processor according to an embodiment of the present invention will be described. For example, a selector for reading out of the general register (hereinafter referred to simply as a GR fetch selector) which is an embodiment of the register selector 12A is composed of a multiplexer 221, a four-input NOR circuit 222, flag register 22A and a three-input OR circuit 223 as shown in FIG. 6.

The function of the GR fetch selector 12A is to fetch the address data of a register having a predetermined specific number to one read port at a timing which is not used in the instruction. For example, a register number designated by the instruction is selected as a fetch number of one fetch port of a predetermined specific register number during a control timing period which is not used in the instruction.

Besides, the multiplexer 221 outputs a signal="GR fetch number" corresponding to operation 1-R3 field, a specific number GR3, operation 1-R1 field, operation 2-R3 field, operation 2-R1 field, operation i=STORE, operation 1=JUMP, operation 2=STORE, operation 2=JUMP obtained by decoding of an instruction, and a set signal S0.

When none of operation 1=STORE, operation 1=JUMP, operation 2=STORE and operation 2=JUMP of an instruction code is designated, the four-input NOR circuit 222 generates a set signal SO and outputs the signal S0 to the multiplexer 221, the flag register 22A and the three-input OR circuit 223.

Further, the flag register 22A is composed of a flip-flop circuit, and receives reset signals S1 and S2, a clock signal CLK and a set signal S0 and outputs a GR3-copy equivalent signal (hereinafter referred to as a CEGR3 signal) or a non-GR3-copy equivalent signal (hereinafter referred to as a CNGR3 signal). The reset signal S1 is operation 1=JUMP. The reset signal S2 is operation 2=JUMP.

The CEGR3 signal shows, for example, that COPY-TEMP-REG 26 holds the same address data as the general register 25 having a specific number GR3. The CNGR3 signal shows that COPY-TEMP-REG 26 does not hold the general register 25 having the specific number GR3.

Besides, the flag register 22A is set when the specific number GR3 is read without selecting an explicit register number by an instruction, and, on the contrary, is cleared when renewal of COPY-TEMP-REG 26 is required and fetching of other than the copy having the specific number GR3 is performed like JUMP operation and parse TLB operation.

With this, it is possible to identify from the address data of the flag register 22A whether COPY-TEMP-REG 26 holds the general register 25 having a specific number or not.

Further, the three-input OR circuit 223 receives operation 1=JUMP, operation 2=JUMP and the set signal S0, and outputs a CTR signal. The CTR signal is a clock signal which is supplied to COPY-TEMP-REG 26.

Figure 7:
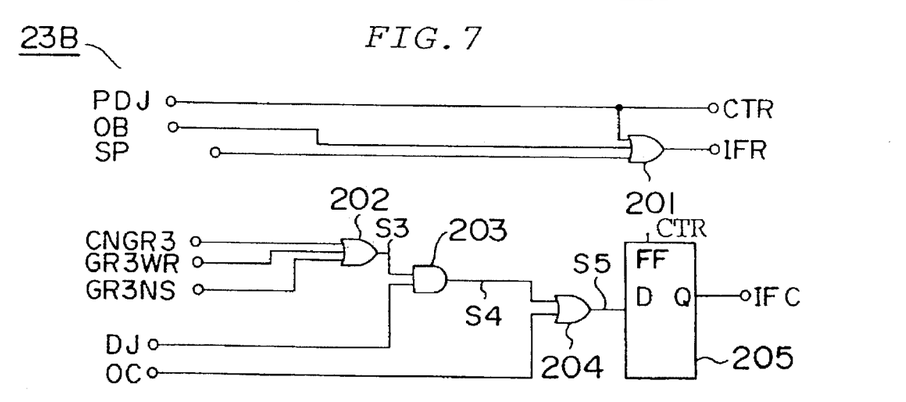
FIG. 7 is a block diagram of a jump controller according to an embodiment of the present invention.

Next, the jump controller 23B of a data processor according to an embodiment of the present invention will be described. For example, the jump controller 23B included in the branch instruction decoder & instruction fetch address calculate/selection controller 231 is composed of three-input OR circuits 201 and 202, a two-input AND circuit 203, a two-input OR circuit 204 and a flip-flop circuit 205 as shown in FIG. 7.

The three-input OR circuit 201 outputs an instruction fetch request signal (hereinafter referred to as an IFR signal) based on a predecode jump signal (hereinafter referred to as a PDJ signal), other branch signal (hereinafter referred to as an OB signal) and a sequential prefetch signal (hereinafter referred to as an SP signal).

The three-input OR circuit 202 outputs an intermediate signal S3 to the two-input AND circuit 203 based on a CNGR3 signal, a GR3 write reserve signal (hereinafter referred to as a GR3WR signal) and the non-GR3-selection signal (hereinafter referred to as a GR3JNS signal). The two-input AND circuit 203 outputs an intermediate signal S4 to the two-input OR circuit 204 based on the intermediate signal S3 and a decode jump signal (hereinafter referred to as a DJ signal). The two-input OR circuit 204 outputs an intermediate signal S5 to the flip-flop circuit 205 based on the intermediate signal S4 and other condition signal (hereinafter referred to as an OC signal). The flip-flop circuit 205 outputs an instruction fetch cancel signal (hereinafter referred to as an IFC signal) based on the clock signal CLK.

With this, it is possible to cancel instruction fetch by the jump controller 23B when it is determined that instruction fetch from the address data of COPY-TEMP-REG 26 by the result of decoding of the execution controller 22 is an error.

Next, the operation of a data processor according to an embodiment of the present invention will be described. For example, when an instruction code fetched from the instruction prefetch buffer 21 is decoded by the execution controller 22 in case JUMP operation is executed in pipe-line processing, execution of the instruction is controlled by the execution controller 22 based on the result of decoding. The address calculation is performed by the ALUs 241 and 242, and the resulted data are held by the general register 25.

Here, the data fetched to a read port having a specific number of the general register 25 are received and held by COPY-TEMP-REG 26. Further, execution of a branch address designated by the general register 25 is controlled by the instruction prefetch control circuit 23.

At this time, the general register 25 having a predetermined specific number GR3 is fetched selectively at one read port in a timing which is not used in the instruction by a GR fetch selector of the execution controller 22, and the address designated by the general register 25 is detected by the branch instruction decoder & instruction fetch address calculate/selection controller 231 of the instruction prefetch control circuit 23 based on the result of decoding of the instruction code fetched from the instruction prefetch buffer 21, and the branch operation thereof is executed.

Further, in the instruction fetch requirement portion 13B, the address data held by COPY-TEMP-REG 26 are outputted to the instruction fetch address bus 19 based on the detection of the branch instruction.

Here, when the general register 25 designated by the branch instruction and the general register 25 having a specific number GR3 coincide with the instruction fetch address, the address data held by COPY-TEMP-REG 26 are made effective.

Figure 8A:
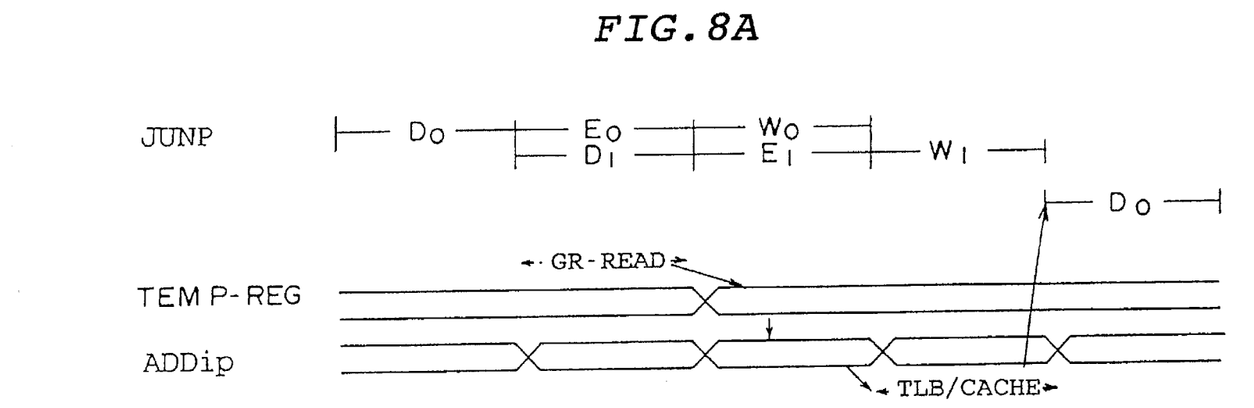
FIG. 8(A) is an operation time chart at time of jump operation (with copy) according to an embodiment of the present invention.

FIG. 8(A) is a timing explanatory diagram at time of JUMP operation when a copy register is not included for comparing with the embodiment of the present invention. In FIG. 8(A), reading of the general register 25 for STORE or JUMP operation is performed at a stage $E_o$ which becomes a first flow of the pipe-line stage.

Here, the fetched data are held in TEMP-REG which was to have no copy function, and are transferred to the instruction fetch address bus 19 by the branch fetch direction from a second flow of JUMP operation. This address $ADD_{ip}$ is held by the address register of the I.M.U/cache 29, where a cache for address conversion (hereinafter referred to simply as a TLB/cache) is referred to.

At this time, when both TLB/caches hit, the address data of the read out cache are transferred to and held by the instruction prefetch buffer 21 as they are. In this case, when COPY-TEMP-REG 26 is to have no copy function, four machine cycles from the first $D_o$ stage of the JUMP instruction to the $D_o$ stage of the branch instruction become necessary.

Figure 8B:
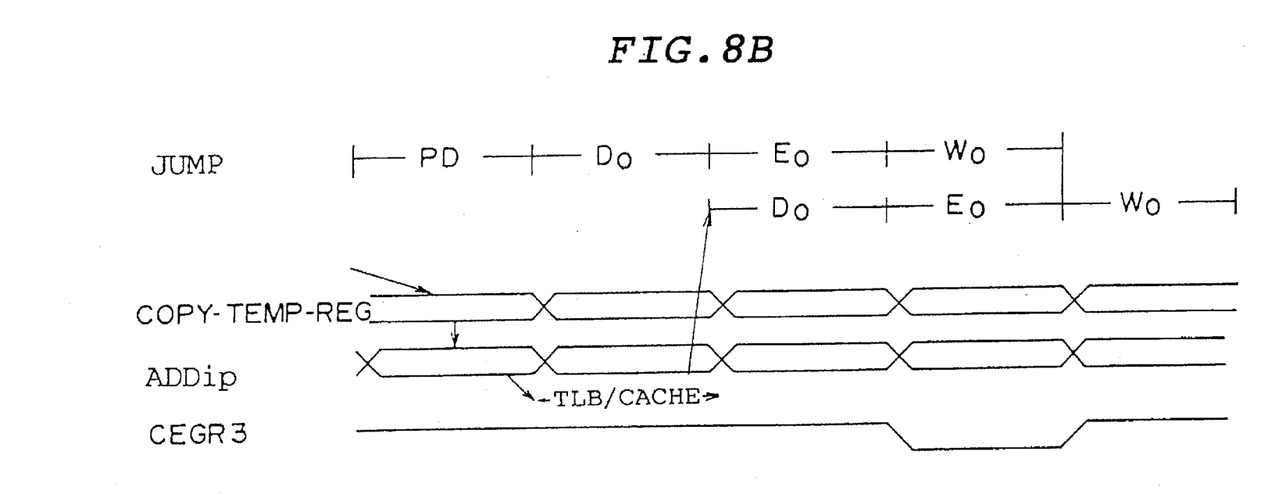
FIG. 8(B) is an operation time chart at time of jump operation (without copy) according to an embodiment of the present invention.

As against the above, in the case of COPY-TEMP-REG 26 which also has copy function according to an embodiment of the present invention such as shown in FIG. 8(B), it is possible to execute processing from the $D_o$ stage of JUMP operation to the $D_o$ stage of the branch instruction leaving no space therebetween.

Namely, FIG. 8(B) shows a case when the address data of the general register 25 indicating the branch address of the JUMP operation have already been copied in COPY-TEMP-REG 26. Here, the specific number of the general register 25 which always performs copying to COPY-TEMP-REG 26 is assumed to be GR3. Further, as to read selection of the specific number GR3, there are operation 1-R1 field, operation 1-R3 field, operation 2-R1 field, operation 2-R3 field or the like as shown in FIG. 5, which are selected respectively by STORE operation, JUMP operation, GR-FR (floating point register) transfer operation, GR-control register transfer operation, special operation such as partial analysis (partial parse) of TLB/cache and so on. In case such explicit selection is not made, a register having a specific number GR3 is selected for copying.

Further, PD represents a predecode stage in the timing diagram shown in FIG. 8(B). At the stage concerned, decoding of an instruction being presently read out of the instruction prefetch buffer 21 and a next instruction being read out in parallel therewith is performed. The stage PD is not necessarily executed by JUMP operation. For example, branch operation is detected directly at the stage $D_o$ sometimes without passing the stage PD in a case, e.g., when an instruction fetched in the first place from an instruction buffer empty state includes JUMP operation.

It is significant for reducing disturbance in the pipe-line due to branching to detect the branch operation ahead of time. When instruction prefetch has been made sufficiently, branch operation is performed at the stage PD as far as possible. Here, when JUMP operation is detected at the stage PD, the address data of COPY-TEMP-REG 26 are outputted unconditionally to the instruction fetch address bus 19. At this time, when a flag showing that the address data of the specific number GR3 are being copied to COPY-TEMP-REG 26 is set, and the write is not reserved in the register of the specific number GR3 by an instruction before this instruction, but the branch address of the JUMP operation is designated by the number GR3 concerned, branch prefetch utilizing COPY-TEMP-REG 26 becomes effective. In such a case, the address data of the general register 25 indicated by the pipe-line flow of the JUMP operation are read out, and indication for instruction fetch becomes no longer required, thus making it possible to process from the stage $D_o$ of the JUMP operation to the stage $D_o$ of the branch instruction leaving no space therebetween.

Figure 9:
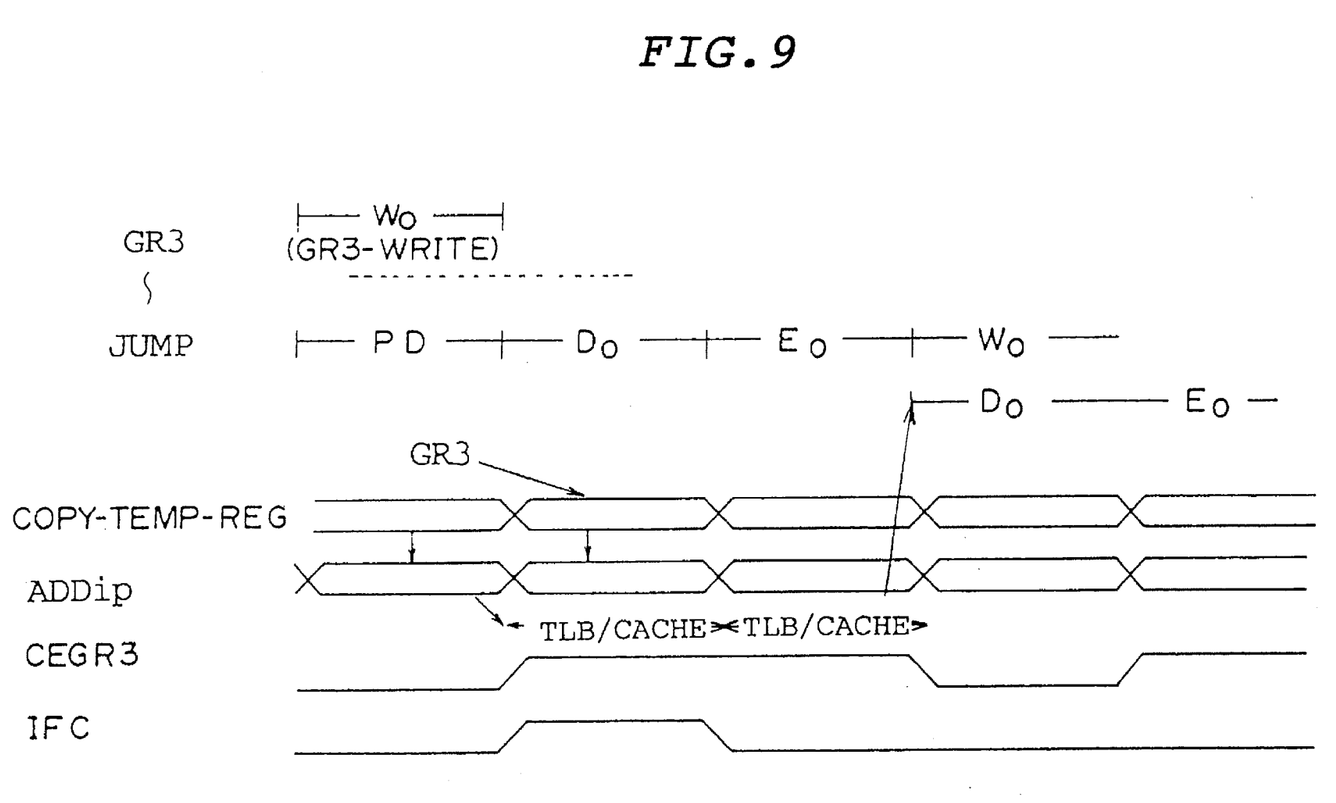
FIG. 9 is an operation time chart at time of jump operation (cancel) according to an embodiment of the present invention.

Further, when the JUMP operation designates the general register 25 having a number other than the specific number GR3 as the branch address in the operation time chart at time of jump operation (cancel) shown in FIG. 9, when write to the specific number GR3 is reserved by an instruction before the JUMP operation or when COPY-TEMP-REG 26 is not a copy of the specific number GR3 and so on, effective instruction fetch is delayed until correct address data are set to COPY-TEMP-REG 26. Further, the branch prefetch by COPY-TEMP-REG 26 becomes ineffective. In such a case, branch instruction fetch is performed over again by an instruction flow similar to the related art of the present invention in FIG. 9.

Thus, according to a data processor of an embodiment of the present invention, there are provided the instruction prefetch buffer 21, the execution controller 22, the instruction prefetch control circuit 23, ALUs 241 and 242, the general register 25 and COPY-TEMP-REG 26 as shown in FIG. 3 to FIG. 7. The GR fetch selector 12A is provided in the execution controller 22, and the branch instruction decoder & instruction fetch address calculate/selection controller 231 and the instruction fetch requirement portion 13B are provided in the instruction prefetch control circuit 23.

As a result, when one read port of the general register 25 is not used explicitly in the instruction, the general register 25 having the specific number GR3 is read. By doing so, the fetched address data are held in COPY-TEMP-REG 26, and, when the jump instruction is detected and the branch address is an instruction designated by the general register 25 having a specific number, it is possible to perform jump operation by using the address data of COPY-TEMP-REG 26.

With this, it becomes possible to process a jump instruction at a high speed without providing an exclusive copy register.

In particular, when this COPY-TEMP-REG 26 serves also as the register for fetching data read out of the general register 25 in the jump instruction designated by the general register 25 having a number other than the specific number GR3, although the hit probability of the COPY-TEMP-REG 26 is lowered by selective read of the general register 25 having a number other than the specific number GR3, it is possible to utilize the address COPY-TEMP-REG 26 for lump operation effectively, thus controlling the enlargement of hardware to the utmost.

Besides, according to a distinctive control method of an embodiment of the present invention, it is identified whether COPY-TEMP-REG 26 holds the address data of the general register 25 having the specific number GR3 or not by the flag register 22A provided in the GR fetch selector 12A.

As a result, in the instruction prefetch circuit 23, when one specific read port of the general register 25 is not used by the instruction during execution, the GR fetch selector 12A is directed so as to fetch the general register 25 having the specific number GR3 selectively to the read port, i.e., the instruction prefetch control circuit 23 directs the GR fetch selector 12A so as to fetch the data into COPY-TEMP-REG 26 and sets the flag register 22A at the same time, and furthermore directs the GR fetch selector 12A so as to fetch any of the general registers 25 selectively to the read port in accordance with execution of several instructions thereby to fetch data into COPY-TEMP-REG 26 concerned and resets the flag register 22A at the same time. With this, it is possible to always confirm the address data of COPY-TEMP-REG 26.

Further, in the execution controller 22, write is reserved in the register designated by the instruction in accordance with execution of the instruction, and the reserved state is held until write into the reserved general register 25 is executed as the result of synchronous or asynchronous processing. When the instruction code fetched from the instruction prefetch buffer 21 is decoded, and the branch instruction designated by the branch address is detected by the general register 25 having a specific number, i.e., when the flag register 22A is in a reset state and write is not prearranged in the general register 25 having the specific number by an instruction before the branch instruction, the instruction fetch address is switched so that instruction fetch is performed with the address data held in the COPY-TEMP-REG 26 as the address.

Furthermore, in the instruction prefetch control circuit 23, the instruction code fetched from the instruction prefetch buffer 21 is decoded, and, when the branch address is designated in the general register 25, instruction fetch is started with the address data held in the COPY-TEMP-REG 26 as the address when the branch instruction is detected.

Here, the instruction fetch is canceled by the instruction prefetch control circuit 23 by one or more primary factors among a case when the instruction designates other than the general register 25 having a specific number, a case when the flag register 22A is reset or a case when write into the general register 25 is prearranged by operation of an instruction before the branch instruction.

As a result, a specific branch instruction is detected by the branch instruction decoder & instruction fetch address calculate/selection controller 231, thereby to start instruction fetch with the address data held by COPY-TEMP-REG 26 as the address. Further, in the jump controller 23B, the instruction fetch is canceled when it is determined that the instruction fetch from the address data of COPY-TEMP-REG 26 according to the result of decoding by the execution controller 22 is an error.

With this, release from increase of hardware quantity and such an operation that the address data of the copy register and the address data of the register file have to be made to coincide with each other is made without providing an exclusive copy register as in the related art of the present invention. In particular, even when it is required to increase the quantity of the ALUs 241 and 242 so as to heighten the degree of parallelism of data processing and the number of writing into register files is increased, release from such an operation that the address data of the register file and the address data of the copy register are made to coincide with each other is made for the write from any port, thus making it possible to reduce the hardware cost to the minimum.

With this, when branch prefetch by COPY-TEMP-REG 26 is correct, it is possible to shorten the execution cycle of branch operation and to check the direction to instruction prefetch in the case of normal operation. Further, it becomes possible to achieve a high speed of jump operation designating the general register 25 having the specific number GR3 and to aim at improvement of processing performance of a data processor while reducing the hardware. Thus, all of modification examples within the true spirit and the scope of the present invention are included in the scope of claim for a patent.

What is claimed is:

1. A method of controlling a data processor comprising:
   a buffer for storing said branch instructions and a plurality of instructions;
   a first controller for decoding instruction other than said branch instructions read from said buffer and controlling execution of said instruction other than said branch instructions;
   a first storage unit having at least a plurality of registers for writing addresses and data required for execution of said plurality of instructions, and a register with a particular number assigned to one of said plurality of registers and for writing target addresses required for execution of said branch instructions therein, and having a plurality of write ports and read ports for selecting registers with numbers designated by said first controller;
   a second storage unit connected to a particular read port of said plurality of read ports, for storing contents of a register read out into said particular read port temporarily;
   a register number selecting means for controlling said particular read port so as to connect said register with said particular number to said second storage unit when said first controller is not using said particular read port;
   a second controller for interpreting said branch instructions from said buffer to control execution of said branch instructions based on said target address stored in said second storage unit; and
   a flag register for indicating whether said register number designated by said first controller coincides with particular register number into which said target address is written,
   wherein branch control comprises the steps of:
      selecting said register number designated by said first controller from said first storage unit by said write port in said first storage unit;
      writing said target address into selected register number, detecting whether said designated number coincides with said particular number, and resetting said flag register if both numbers coincide with each other or if contents of said register with said particular number, by said first controller;
      controlling said particular read port so as to connect said register with said particular number to said second storage unit unless said particular read port is being used by said instruction other than said branch instructions, by said register number selecting means;
      controlling said flag register into a set state when contents of said register with said particular number is copied in said second storage unit, by said first controller; and
      utilizing contents of said second storage unit as said target address by said second controller if said target address using said contents of a register in said first storage unit as said target address is detected and said register number designated by said target address coincides with said particular number and then a coincidence between said contents in said second storage unit and said contents of said register with said particular number is confirmed by said flag register.

2. A data processor having function for executing branch instructions, comprising:
   a buffer for storing said branch instructions and a plurality of instructions;
   a first controller for interpreting sequentially said plurality of instructions stored in said buffer and controlling execution of said plurality of instructions except for said branch instructions;
   an arithmetic and logic unit for operating addresses and data necessary for execution of said plurality of instructions except for said branch instructions;
   a first storage unit having at least a plurality of registers for writing addresses and data from said arithmetic and logic unit therein, and a register with a particular number assigned to one of said plurality of registers and for writing target addresses required for execution of said branch instructions therein, and having a plurality of write ports and read ports for selecting registers with numbers designated by said first controller;
   a second storage unit connected to a particular read port of said plurality of read ports, for storing contents of a register read out into said particular read port temporarily;
   a register number selecting means for selecting respective register numbers assigned to said plurality of read ports, said register number selecting means controls said particular read port to connect a register with number designated by said first controller to said second storage unit and controls said particular read port to connect a register with said particular number to said second storage, unit when said first controller is not using said particular read port; and
   a second controller for interpreting instructions from said buffer to detect said branch instructions which use contents of register in said first storage unit as target address, and for executing said branch instructions based on said target address stored in said second storage unit.

3. The data processor according to claim 2, wherein said first controller has a flag register for indicating whether or not number of a register designated by said first controller coincides with a particular number of a register into which said target address is written.

4. The data processor according to claim 2, wherein said second controller detects coincidence between a number of said register designated by said branch instruction and said particular number when it detects said target address using contents of said register in said first storage unit as a target address, and executes said branch instruction using contents of said second storage unit as target address when a coincidence between contents in said second storage unit and contents of a register with said particular number is detected.

5. The data processor according to claim 2, wherein said second controller comprises:
   a predecode controller for commencing instruction fetch using address data stored in said second storage unit as a target address; and
   a jump controller for canceling said instruction fetch if said instruction fetch is decided as false.

6. The data processor according to claim 3, wherein said flag register is reset if a register number designated by said register number selecting means coincides with said particular number of said register into which said target address is written, and is set if contents of said register with said particular number in said first storage unit are copied into said second storage unit.

7. The data processor according to claim 2, wherein said second controller has a function which can recognize whether address data stored in said second storage unit coincides with address data stored in said register with said particular number by monitoring that said flag register is in either a set state or a reset state.

8. The data processor according to claim 2, wherein said first controller has a function which sets said register with said particular number in a write reservation state when write instruction into said register with said particular number in said first storage unit is detected, and resets said write reservation state when address data of said branch instruction is written into said register with said particular number.

9. The data processor according to claim 6, wherein
   said first controller has a function which sets said register with said particular number in a write reservation state when write instruction into said register with said particular number in said first storage unit is detected, and resets said write reservation state when address data of said branch instruction is written into said register with said particular number,
   said second controller has a function which can recognize whether address data stored in said second storage unit coincides with address data stored in said register with said particular number by monitoring that said flag register is in either a set state or a reset state, and
   said second controller has a predecode controller for commencing instruction fetch using address data stored in said second storage unit as a target address, and a jump controller for canceling said instruction fetch if said instruction fetch is decided as false.

10. The data processor according to claim 9, wherein said jump controller cancels said instruction fetch in at least one of the following conditions:
    1) said branch instruction detected by said second controller designates a certain register excluding said register with said particular number in said first storage unit,
    2) said flag register is ret, and
    3) said register with said particular number is in a write reservation state.

* * * * *